(12) United States Patent
Greene et al.

(10) Patent No.: US 7,797,281 B1
(45) Date of Patent: Sep. 14, 2010

(54) GRANULAR RESTORE OF DATA OBJECTS FROM A DIRECTORY SERVICE

(75) Inventors: Christopher Greene, Longwood, FL (US); Andrew B. Montcrieff, Oviedo, FL (US); Matthew W. Brocco, DeBary, FL (US); Steven R. DeVos, Kirkland, WA (US)

(73) Assignee: Symantec Operating Corporation, Mountain View, CA (US)

( * ) Notice: Subject to any disclaimer, the term of this patent is extended or adjusted under 35 U.S.C. 154(b) by 775 days.

(21) Appl. No.: 11/654,680

(22) Filed: Jan. 12, 2007

(51) Int. Cl.
*G06F 17/00* (2006.01)
(52) U.S. Cl. ............................... 707/647; 707/675
(58) Field of Classification Search ............. None
See application file for complete search history.

(56) References Cited

U.S. PATENT DOCUMENTS

| | | | |
|---|---|---|---|
| 5,832,274 A * | 11/1998 | Cutler et al. | 717/171 |
| 5,893,107 A | 4/1999 | Chan et al. | |
| 6,073,128 A * | 6/2000 | Pongracz et al. | 1/1 |
| 6,625,603 B1 | 9/2003 | Garg et al. | |
| 6,665,815 B1 * | 12/2003 | Goldstein et al. | 714/20 |
| 6,769,074 B2 * | 7/2004 | Vaitzblit | 714/16 |
| 6,915,287 B1 * | 7/2005 | Felsted et al. | 707/1 |
| 7,024,434 B2 | 4/2006 | Fuller et al. | |
| 7,529,777 B1 * | 5/2009 | Kryger | 707/202 |
| 2001/0020254 A1 * | 9/2001 | Blumenau et al. | 709/229 |
| 2002/0059329 A1 * | 5/2002 | Hirashima et al. | 707/204 |
| 2002/0169767 A1 | 11/2002 | Harvey | |
| 2002/0178249 A1 * | 11/2002 | Prabakaran et al. | 709/223 |
| 2003/0213316 A1 * | 11/2003 | Harvey | 73/866.4 |
| 2004/0260973 A1 * | 12/2004 | Michelman | 714/13 |
| 2006/0004890 A1 * | 1/2006 | Semple et al. | 707/204 |
| 2007/0022290 A1 * | 1/2007 | Itoh | 713/168 |
| 2007/0027937 A1 * | 2/2007 | McGrattan et al. | 707/204 |
| 2007/0198790 A1 * | 8/2007 | Asano et al. | 711/162 |
| 2008/0005198 A1 * | 1/2008 | Cobb | 707/204 |
| 2008/0155319 A1 * | 6/2008 | Duncan et al. | 714/13 |

OTHER PUBLICATIONS

"LDAP Implementation Cookbook," by Johner et al (1999). Available at: http://citeseerx.ist.psu.edu/viewdoc/download?doi=10.1.1.4.5869&rep=rep1&type=pdf Last Visited: Feb. 19, 2010.*

* cited by examiner

*Primary Examiner*—Neveen Abel Jalil
*Assistant Examiner*—Daniel Kinsaul
(74) *Attorney, Agent, or Firm*—Meyertons, Hood, Kivlin, Kowert & Goetzel, P.C.

(57) ABSTRACT

A system and method for performing a granular restore of data objects from a directory service is disclosed. In one embodiment, at the time a backup of the directory services database is performed, a metadata file with index values for some data objects is created. The metadata file may include an index of the name and an object identifier for each included data object. During granular restore of one or more data objects selected for restoration, the corresponding object identifier is retrieved from the metadata file using the name of the data object. The object identifier is then used to restore the data object in the directory service.

21 Claims, 6 Drawing Sheets

GRANULAR RESTORE OF DATA OBJECTS FROM A DIRECTORY SERVICE

BACKGROUND OF THE INVENTION

1. Field of the Invention

This invention relates to the field of information processing systems and, more particularly, to backup and restore of data objects from an object database.

2. Description of the Related Art

Modern computer networks include so-called "directory services," which are software applications (or sets of applications) for storing and organizing information about users, services and resources. A directory service also allows network administrators to manage users' access to resources. Common directory services include NIS (Sun Microsystems, Inc.), eDirectory (Novell, Inc.), Fedora Directory Server (Red Hat, Inc.), Active Directory and NTDS (Microsoft Corp.), Open Directory (Apple Computer, Inc.), ApacheDS (Apache Software Foundation), OID (Oracle Corp.), and also the open-source software OpenLDAP. The X.500 series developed by ITU-T is a series of computer networking standards covering electronic directory services.

A given directory service is associated with a "directory repository," which is the database that stores the information that is managed by the directory service. For example, a directory repository may include one or more "namespaces" that include a hierarchy of data (e.g., data objects). The directory service thus acts as an interface that can authenticate access to the system resources that manage data in the directory repository. For example, a directory service allows the directory repository to be searched on the many different attributes or object identifiers that can be associated with objects within the repository.

A backup of a directory repository associated with a directory service is generally "monolithic"—that is, the entire repository is replicated. The corresponding restore operation for a directory repository is often monolithic as well. Monolithic restore operations are often complex, inefficient, and time-consuming.

SUMMARY

Various embodiments of a method and system for backing up and restoring data objects of a database associated with a directory service are disclosed. In one embodiment, a method for backing up the object database by a computer system comprises copying a plurality of data objects from a database to a backup medium, wherein said database is associated with a directory service.

For at least a first of said plurality of copied data objects, the database is queried to determine a first private object identifier (POI) associated with the first data object, wherein the POI is usable to restore the first data object via a first interface of the directory service, and wherein said computer system is not configured to generate, from the backup medium, the first POI. Additionally, the first POI is stored as metadata associated with the first data object.

In some embodiments, the first POI may be generated using a proprietary protocol associated with the directory service. The metadata may be stored in a metadata file, where the metadata file includes an index value and an associated POI for each of one or more of the plurality of copied data objects. The metadata file may also be stored on the backup medium.

In still further embodiments, a request to restore the first data object to the directory service is initiated. The first data object is received from the backup medium. The previously stored metadata associated with the first data object, including the first POI, are received. Then, the first POI and the received first data object are used to restore the first data object via the first interface of the directory service. At least a portion of the POI may be encrypted. The first interface may be a cached API and the first POI may be required to access the directory service via the first interface.

In some embodiments, the computer system is configured to perform the backup via a second interface to the directory service. The first and second interfaces may be different interfaces of the directory service using different authentication protocols.

In yet another embodiment, a request to restore a first data object from a backup medium to a database associated with a directory service is initiated. The first data object is received from the backup medium. A first object identifier is received from a location external to the database, wherein the computer system is not configured to generate the first object identifier from the backup medium. The received first data object and the received first object identifier are used to restore the first data object to the database. The first interface may use an authentication protocol that includes, for the first data object, the first data object and the first object identifier.

The generation of said first object identifier may use a proprietary protocol associated with the directory service, wherein at least a portion of said first object identifier is encrypted. The directory service may be accessible using a lightweight directory access protocol (LDAP). The first interface of the directory service may be accessible via a cached API.

Another embodiment is represented by a computer readable medium including program instructions executable to backup and restore data objects according to the methods described herein. A computer system embodiment includes a processor and a memory storing program instructions executable by the processor to backup and restore data objects according to the methods described herein.

Figure 1:
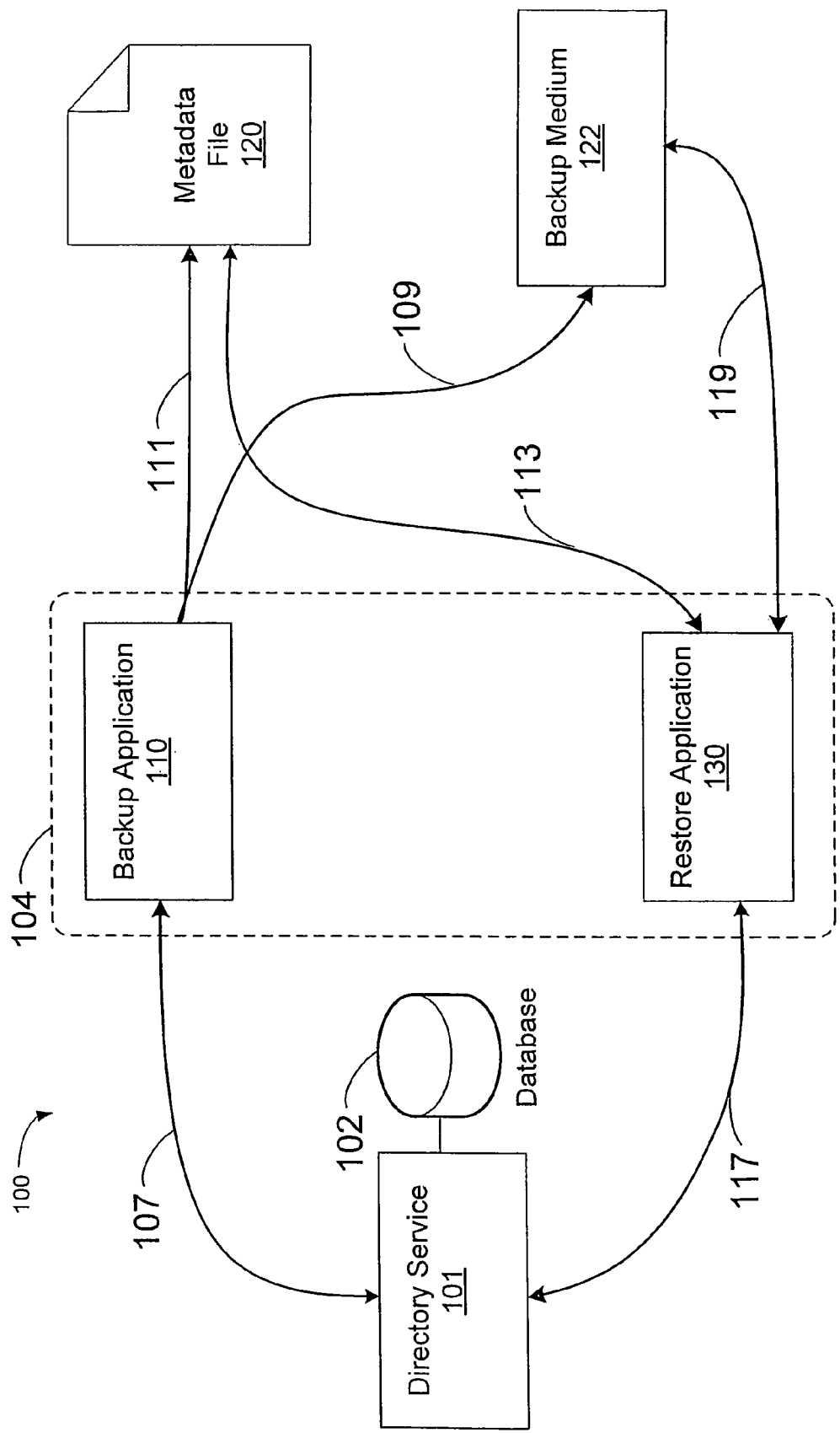
FIG. 1 is a block diagram of one embodiment of an archival system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Referring to FIG. 1, a block diagram is shown of one embodiment of an archival system 100 for a database or directory repository associated with a directory service. As illustrated, database 102 is associated with a directory service 101, which is configured to manage and maintain a plurality of data objects for a plurality of system users or client systems. Some standards for directory services include X.500 and the lightweight directory access protocol (LDAP). An application program 104, which in this embodiment includes a backup module 110 and a restore module 130, interfaces to database 102 via interfaces 107 and 117. Backup module 110 interfaces to metadata file 120 and backup medium 122 via interfaces 111 and 109, respectively. Similarly, restore module 130 interfaces to metadata file 120 and backup medium 122 via interfaces 113 and 119, respectively.

In FIG. 1, database 102 is associated with directory service 101. Directory service 101 acts an interface to programs or services wishing to access database 102. For example, the backup and restore modules (110 and 130, respectively) of application program 104 access database 102 via interfaces 107 and 117. In other embodiments, application program 104 and other programs may interface directly with database 102. Directory service 101 and database 102 may include user interfaces, program code and data interfaces for operating directory service 101. Database 102 may further include tables, indexes, relationships, queries, stored procedures, file systems, security layers, networking interfaces, etc., as needed to access the constituent plurality of data objects (also referred to as records or entries). One embodiment of a database 102 is a relational database, in which the records are arranged in tables according to a row and column arrangement. In another embodiment, database 102 is an object database, in which the data objects are organized according to one or more hierarchical namespaces. In various embodiments, database 102 includes a core data store that uses the Indexed Sequential Access Method (ISAM). Directory service 101 is an interface for creating and modifying database 102 for storing and accessing information according to the particular implementation of database 102 (e.g., relational database, object database). In some embodiments, database 102 executes on a dedicated computing system that is configured for access by other server and client computers via a communications network.

As mentioned previously, database 102 and directory service 101 may be configured differently in various embodiments. For example, database 102 may be wholly embedded within directory service 101. In another example, database 102 may be accessed independently of directory service 101. In various embodiments, at least some of the accesses to database 102 are independent of directory service 101, while other accesses to database 102 are via directory service 101.

Directory service 101 may provide an interface to data objects contained in one or more "namespaces" or "directory trees." A directory service may thus include a definition of a "namespace" for a computer network. A namespace is the set of rules that define how network resources are named and identified. Each entry stored in the database of the directory service (i.e., each data object) can be specified using attributes that establish a unique and unambiguous name. The data objects may be organized in a hierarchical namespace with parent and child classes of objects. The information defining a particular hierarchical namespace is also referred to as a "directory information tree."

The objects in database 102 (e.g., objects in a directory information tree) may be accessed using an "object identifier," which may include a root and successive nodes within the namespace. In this notation, a series of numbers representing nodes identify each node in a directory information tree. One example of an object identifier is the Abstract Syntax Notation One (ASN.1) standard defined by ITU-T (Geneva, Switzerland). In directory services that use LDAP, each class of data objects and each type of attribute is also assigned a unique object identifier. Other attributes in an object name can include security and access parameters.

The object identifier associated with a data object may occur in a wide variety of formats. As mentioned above, ASN.1 is a standard notation for object identifiers used with LDAP and other types of directory services. Even within the ASN.1 standard, there are several kinds of encoding rules for compressing or encrypting object identifiers. However, some implementations of directory services rely upon object identifiers that cannot easily be generated outside of the corresponding directory service/database. Such object identifiers are "private" relative to a given computer system if the computer system is not configured to generate the object identifier outside of the context of the directory service and corresponding database. For example, an object identifier that is generated by a proprietary algorithm within a database (e.g., the ASN-based-notation identifier with Microsoft's Active Directory) is private relative to a computer system that is not configured to run the proprietary algorithm. A private object identifier may be referred to as a "POI."

A POI, similar to a standard object identifier, may be in the form of binary data, such as a number or a string, and may be limited to a specific size or data type (i.e., 32-bit integer). The POI may be just an index value that refers to an entry in a list of additional object-identifying data. The POI may also include additional information, including information relating to one or more of the following: hardware platform, network domain, user identification, access control list, system interface, encryption certificate, etc. A POI for a data object may include an encrypted or compressed representation of at least a portion of a non-private object identifier for the data object.

In one embodiment, an object identifier can be queried from an implementation of a directory service, but cannot generally be obtained from a copy of the data object. For example, an object identifier may be the result of a proprietary algorithm that operates on an ASN.1-compliant object identifier. The directory service implementing the proprietary algorithm to generate the object identifier may require the identifier for certain types of access to the database. In one embodiment, a directory service may require that an object identifier generated using proprietary means be provided as part of an authentication protocol for replacing or creating data objects in the database. In some embodiments, the POI may be used with an interface layer associated with one or more types of directory services. For example, Microsoft's Active Directory Services Interface (ADSI) requires an object identifier in a proprietary format for accessing data objects in Active Directory.

As stated above, application program 104 may access database 102 via interfaces 107 and 117, respectively. In particular, backup module 110 may access database 102 via interface 107, while restore module 130 may access database 102 via interface 117. Interfaces 107, 117 may include a local or remote network interface, and may also include network and/or software driver layers for communicating with database 102. In one embodiment, interfaces 107, 117 provide an SQL (Structured Query Language) interface to database 102. In another embodiment, interfaces 107, 117 access database 102 using a lightweight directory access protocol (LDAP) via directory service 101. In one particular embodiment, directory service 101 is a Microsoft Active Directory and interfaces 107, 117 are Joint Engine Technology (JET Blue) or Extensible Storage Engine (ESE) interfaces (also from Microsoft Corporation) for accessing database 102. Interfaces 107, 117 may also provide for access via standardized application programming interfaces, known as APIs.

An API for accessing interfaces 107, 117 may include a library of software functions which can be called by external programs for accessing database 102 via directory service 101. In one embodiment, the API for interfaces 107, 117 that encapsulates additional protocol layers also includes a caching mechanism for processing multiple transactions. Some APIs for interfaces 107, 117 may provide access to a variety of specific implementations of directory services 101 and its associated database 102, such that program code developed using the API functions can be used with different kinds of directory services 101. One example of a cached API for accessing directory services 101 is the Active Directory Services Interface (ADSI) by Microsoft, Corp. In some embodiments, ADSI is a standardized API associated with interface 107, 117 that can accept a POI as a parameter for a function that accesses a data object. It is noted that an API may encapsulate addition interface layers. For example, ADSI encapsulates interface layers LDAP and JET/ESE.

In some configurations, where an API is used via interfaces 107, 117, the API may generate an object identifier for accessing data objects. The means for generating this object identifier may not be available outside of the API, resulting in an object identifier that is "private." Furthermore, in some embodiments, the API may require the object identifier for write access to data object via interface 117 (i.e., write, overwrite, delete, create, restore, etc.). In some configurations, the object identifier may represent an element of the security model that protects the data in directory service 101. In some embodiments, an ASN.1 encoded object identifier is required by an API at interface 117.

Application program 104 is configured to backup and restore the contents of database 102. Although application program 104 is shown as including both backup module 110 and restore module 130, in another embodiments, the backup and restore function are in separate programs. Backup application 110 and restore application 130, singly or in combination, may also be configured to provide other known archiving functionality, as desired, such as various features provided by the Enterprise Vault™ or Backup Exec™ products from Veritas Corporation.

Application program 104 is operable (via backup module 110) to archive copies of data objects from directory service 102 to backup medium 122. Backup medium 122 may be any suitable type of memory medium, including a tape drive, a disk drive, a storage array, an entire storage sub-system, etc. Backup medium 122 may also be located at a remote site, in which case interfaces 109 and 119 include a network interface. For example, backup medium 122 may be a storage area network (SAN) in some embodiments, or a logical volume created on a SAN. Application program 104 (via restore module 130) is also operable to restore data objects from backup medium 122 to database 102.

Backup medium 122 may be accessed by restore module 130 of application program 104 via interfaces 109 and 119. In some embodiments, interfaces 109 and 119 may not be configured with the same functionality, complexity or security that interfaces 107, 117 provide in some embodiments, as the data stored on backup medium 122 may not be an operational directory service, but an archived copy of the information in database 102. In other embodiments, interfaces 109 and 119 are similar to the interfaces 107 and 117 described above. For example, where directory service 101 is Active Directory, interfaces 109 and/or 119 can be JET-ESE interfaces. Interfaces 109 and 119 can also include a local or wide-area network, in the case of a backup medium 122 that is remote from directory service 101 and database 102.

During the backup process, backup module 110 of application program 104 is also configured to determine "metadata"—that is, data associated with data objects that have been copied to backup medium 122. In one embodiment, the metadata for a particular data object is read from database 102 at approximately the same time the data object is copied to backup medium 122. In one embodiment, the metadata is then copied to metadata file 120, which may be the same located on backup medium 122 or any other suitable storage medium. Metadata file 120 and backup medium 122 need not be located on the same storage medium, or in the same storage network. Although metadata file 120 is shown as a single file, it may be stored as a plurality of files, as data objects, within a database, or any other suitable means.

The metadata for a particular data object includes, but is not limited to, an object identifier (e.g., a POI) that is usable to access database 102 via interface 117. In some embodiments, the object identifier/POI for a particular data object may be usable to allow application program 104 to restore individual data objects (and not simply the entire database as part of a monolithic restore operation). In this manner, a "granular" restore feature is achieved. The metadata stored in metadata file 120 may also include additional information—for example, an index of POIs along with the corresponding name for each of the data objects stored on the backup medium.

For example, using the ADSI interface to access an Active Directory, an object identifier is returned upon querying data objects for backup. This same object identifier is required for restoring the data objects via ADSI. If the object identifier of a data object to be restored is not available, then the data object cannot be restored in a granular manner using ADSI. Since the POI is associated with communication between directory service 101 and database 102, it is not stored in database 102. Therefore, there is no provision for storing POIs on the backup medium during backup of database 102.

When a POI is needed to access an interface of database 102, the metadata stored in metadata file 120 can be used by restore module 130 of application program 104 to restore one or more data objects from the backup medium 122 to database 102. Restore module 130, upon being requested (via a graphical user interface or otherwise) to restore one or more data objects, accesses metadata file 120 to determine the POIs for the data objects desired to be restored. Restore module 130 then uses these POIs to access database 102 via interface 117 in order to restore data from backup medium 122.

The restoration of a selected data object may be preceded by reading certain index values from backup medium 122 and using these index values to index information in metadata file 120. For example, restore application 130 may read the name (or other metadata) of a selected data object from backup medium 122 and use the name to retrieve a POI for that data object from metadata file 120. In this manner, POIs for one or more data objects may be supplied by restore application 130 to interface 117, along with other information, for reconstructing the respective data objects in directory service 101. In various embodiments, other kinds of metadata may be stored as index values in metadata file 120. Also illustrated in FIG. 1 is backup application 110, which can be configured to perform a backup of the contents of the database 102 associated with directory service 101. As will be discussed in detail below, backup application 110 can be configured to generate and store metadata 120 associated with data objects along with the backup of database 102 stored on backup medium 122. It is noted that backup medium 122 may represent an identical instance of the database 102 at the time the backup was performed. The metadata 120 may then be used to access or restore the contents of backup medium 122 and to restore individual data objects in directory service 102.

Backup application 110 is operable to archive to a backup medium such as removable storage (or any other type of archive storage). Alternatively, selected data objects may be transferred from directory service 102 to a remote archive storage through a network interface. Restore application 130 is operable to restore data objects or other data acquired from previous archive operations to directory service 102.

It is noted that in the embodiment illustrated in FIG. 1, backup application 110 may communicate with directory service 102 via interface 107 for selecting and retrieving content for archiving. In various embodiments, interface 107 between backup application 110 and directory service 102 may include a network connection along with the necessary network and software drivers, as previously mentioned. The backup application generates a backup copy of the database 102 on backup medium 122, which may be stored on a storage medium separate from directory services 102 or in other appropriate locations.

Figure 2:
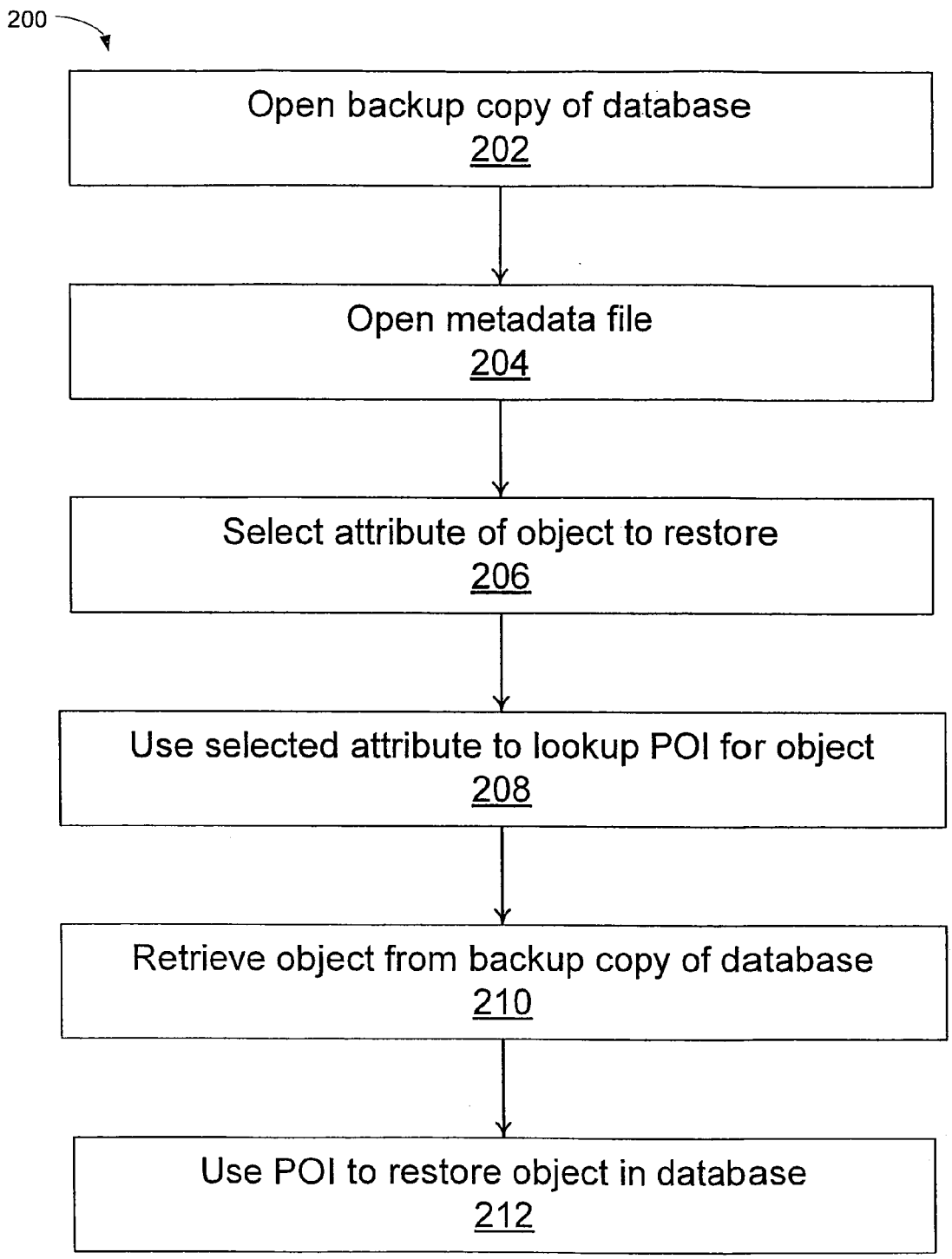
FIG. 2 illustrates one embodiment of a method for accessing archived data objects.

Turning now to FIG. 2, one embodiment of a method 200 for restoring data objects is illustrated. The method 200 may be executed in one embodiment by restore application 130. In step 202, the backup repository 122 is opened for reading. In one embodiment of step 202, an open command is sent via interface 119 with parameters specifying the backup repository 122. In another embodiment, a database engine, for example JET-ESE (Microsoft Corp.), is used to open a connection to repository 122 in step 202. It is noted that steps shown in method 200 may be optional or arranged in a different manner in various embodiments.

In step 204, the metadata file is opened for reading. In one embodiment of step 204, a file open command is sent to the file system with parameters specifying the metadata file 120. In another embodiment of step 204, wherein the metadata file has been embedded within backup repository 122, the metadata file is located and extracted. In step 204 the contents of the metadata file 120 may be read, parsed, and made available to restore application 130. In one embodiment, restore application 130 reads data from metadata file 120, including the name and POI for each data object being restored, as desired.

In step 206, an attribute of the data object to restore is selected. The attribute is used to identify the data object, for example, a name or object identifier for the data object. The selection may be performed within restore application 130. Data objects for restoration may be selected from a list of available data objects, for example, with a user interface. In some embodiments, the available data objects are queried (based on an attribute value) and a selection is made from the query results. In some embodiments, the selection of data objects in step 206 may be performed by accessing the metadata file 120, and reading the names of data objects available for restoration. It is noted that in method 200, steps 206-212 are described for a single data object. One skilled in the art would appreciate that these method steps could be repeated in other embodiments for any number of data objects. In some embodiments, steps 206-212 could be individually performed for a plurality of data objects, as desired. In one embodiment of step 206, the name of the data object is used to identify which data objects have been selected for restoration.

In step 208, the name of the one or more data objects selected in step 206 are used to look up the POI for each data object in the metadata file 120. (As described in detail below with respect to FIG. 4, the respective POIs for the selected data objects have been previously stored during backup in metadata file 120.)

In step 210, the one or more data objects selected in step 206 are retrieved from the backup copy of the directory repository 122. The retrieval of data objects from backup repository 122 can be performed by restore application via interface 119. As will to be appreciated by a skilled artisan, step 210 may alternatively be performed prior to step 208 in some embodiments. If for some reason, some data objects, cannot be retrieved from backup repository 122, the method may skip further processing for those data objects and may optionally return an error message with indication of the issue at hand, while restoration of other data objects continues. In some embodiments, the entire restoration is halted if any one of the selected data objects cannot be retrieved in step 210.

After the selected one or more data objects have been retrieved in step 210, the individual data objects are restored in step 212. A respective POI may be used to identify and restore data objects via interface 117. For example, if interface 117 represents an ADSI interface, a POI in the ASM.1 format can be provided for each data object being restored. Other formats and interfaces may be implemented in various embodiments. In some embodiments, depending on the size or number of the one or more selected data objects, step 212 may be performed sequentially or collectively with respect to the data objects. As noted previously, interface 117 may include a caching function for enabling restore application 130 to rapidly execute for a plurality of data objects. Thus the method step 212 represents a granular restore for selected data objects that does not require the restoration of the entire directory service 102, and can be performed while directory service 102 remains installed and operational.

Figure 3:
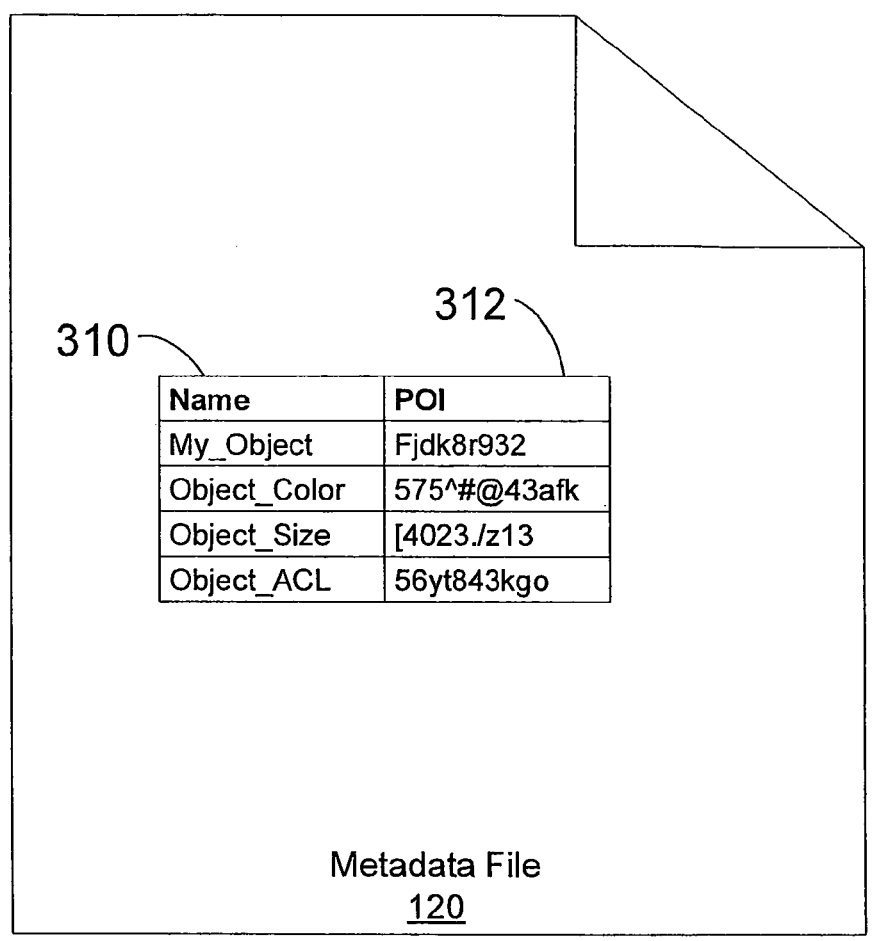
FIG. 3 illustrates one embodiment of metadata used for restoring data objects.

Referring now to FIG. 3, the contents of an illustrative set of metadata stored in metadata file 120 are shown. In the embodiment shown in FIG. 3, the metadata file 120 is a lookup table, wherein the names 310 and POIs 312 of a number of data objects have been indexed to each other (e.g., by backup module 110 during a previous backup of database 102). The actual format of the metadata file 120 may of course vary. Such a metadata file may be used to facilitate the restoration of data objects to database 102 by providing, in response to an attribute such as the name of a data object, a POI that may be needed to restore a data object via interface 117 to database 102.

Figure 4:
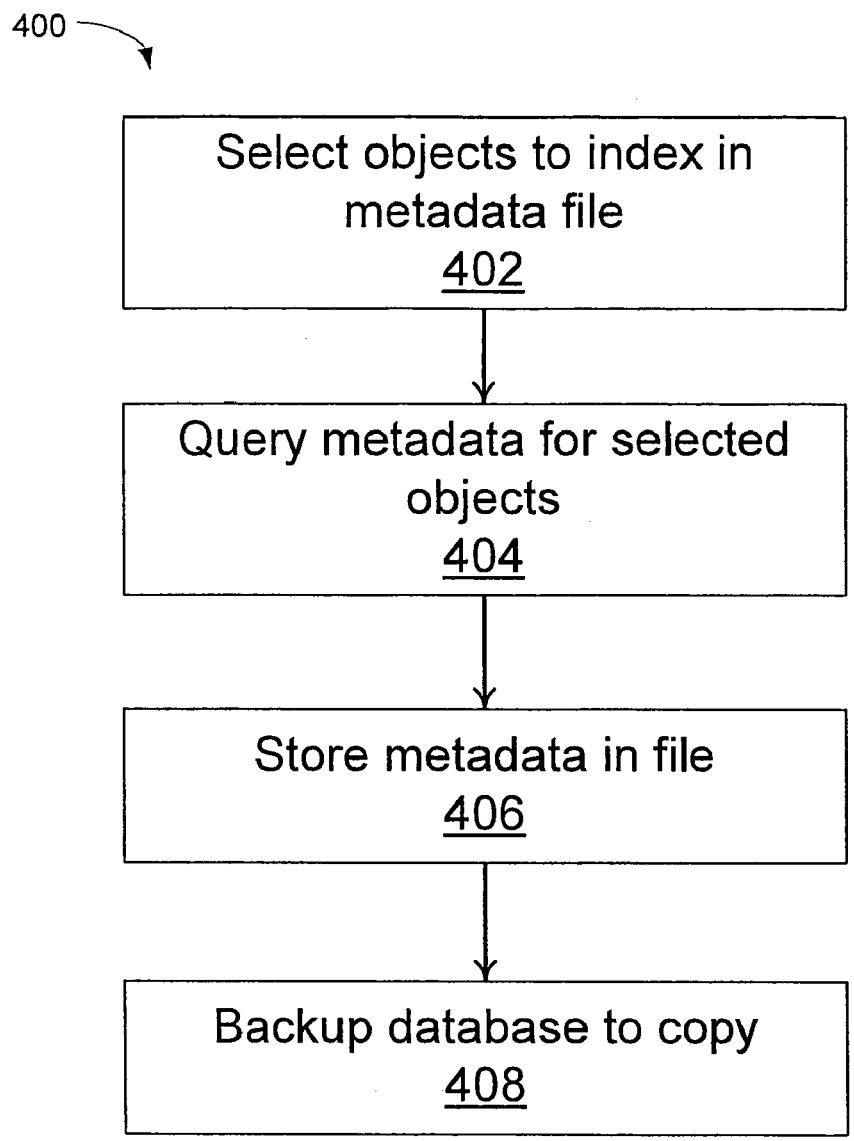
FIG. 4 illustrates one embodiment of a method for archiving data objects.

Referring now to FIG. 4, one embodiment of a method 400 for querying a directory service 102 to generate a metadata file 120 is illustrated. It is noted that for a given directory service 102 and metadata file, the method illustrated in FIG. 4 is executed by backup application 110 prior to the restore method illustrated in FIG. 2. It is further noted that certain steps shown in method 400 may be optional or arranged in a different manner in various embodiments. As mentioned previously, the method 400 provides the advantage of being quick and simple to execute, by using directory service 102 to generate the metadata file 120, at the time the backup is performed. At the moment the backup is performed, the query features of directory service 102 are available to backup application via interface 107, and the repository in directory service 102 is also consistent with the backed up copy of the repository 122.

In step 402, one or more objects are selected, whose metadata is to be included in metadata file 120. It is noted that the selection performed in step 402 need not be the same as performed in step 206. In various embodiments, method 400 may be performed individually or collectively with respect to a plurality of data objects. The selection in step 402 (along with the other steps in method 400) may be performed "on the fly" (that is during a backup operation), prior to the backup operation, or subsequent to the backup operation. In step 404, the database is queried for metadata for one or more selected data objects, including a POI for each data object. In certain embodiments of interface 107, a POI may be returned by a query for a data object. The same POI can be used via interface 117 to granularly restore that data object in directory service 102.

In step 406, the metadata are stored in the metadata file 120. In some embodiments, the metadata file 120 may be stored on a storage medium by a file system. In other embodiments, the metadata file 120 is included with the backup copy of the repository 122.

In step 408, the repository of directory service 102 is backed up to the backup repository 122. As a skilled artisan would recognize, step 408 may alternatively be performed different arrangements with respect to order and parallel execution in various embodiments of method 400. While performing the steps of method 400, care should be taken to prevent any transactions or usage of directory service 102 that would comprise the consistency of backup repository 122 with the metadata file 120.

Thus methods 400 and 200 represent backup and restore methods, wherein, among other things, data objects may be granularly (i.e., individually) restored to a database via a directory service. The generation and usage of a POI according to the methods described herein may alternatively be performed in various other embodiments and contexts, for a variety of operational purposes. It is further noted that although data objects have been described herein in various embodiments, the methods described herein are equally applicable to various kinds of data identified by the records of a database, including binary objects of various size and data stored in the fields of the record itself.

For example, an object database may generate a POI for a variety of uses and purposes, depending on the designed architecture of the database. In one embodiment, a POI is used for securing access to data objects, and includes encryption by an authenticated certificate. In another instance, POIs are used in conjunction with an access control list to restrict access to data objects. In some embodiments, POIs are used to ensure data integrity of the data object, for example by including a checksum of the data object. In yet other embodiments, a POI represents a memory address for accessing data objects cached in faster memory in an object database. In still other embodiments, POIs are generated in an undisclosed manner, for classified access to data objects, wherein the POI is required for a specific interface to the object database.

Figure 5:
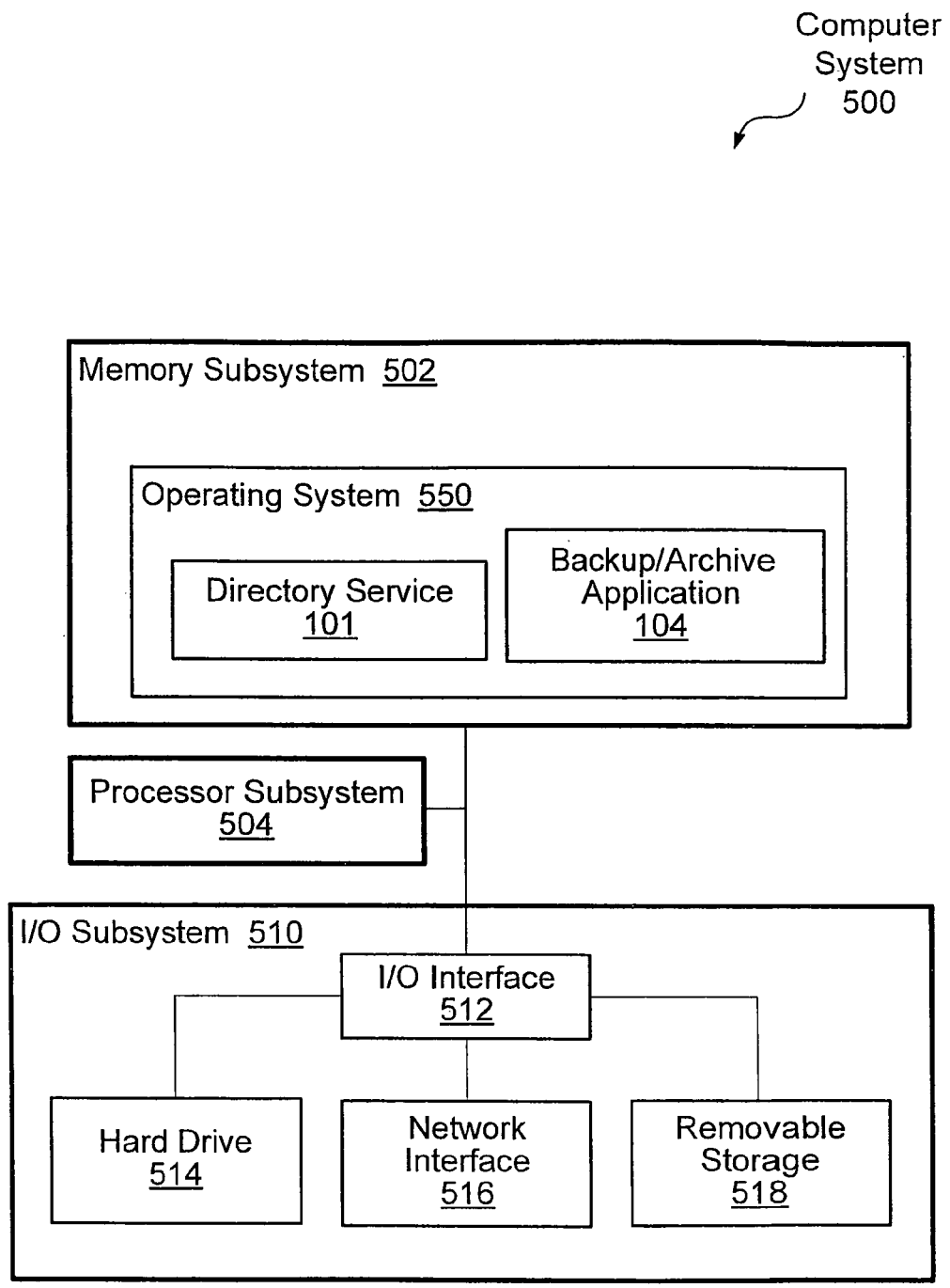
FIG. 5 is a block diagram of one embodiment of a computer system.

Turning now to FIG. 5, a block diagram of one embodiment of a computer system 500 is illustrated. Computer system 500 includes a processor subsystem 504 coupled to a memory subsystem 502. Processor subsystem 504 and memory subsystem 502 are in turn connected to an I/O subsystem 510, which comprises an I/O interface 512, a hard disk drive 514, a network interface 516, and a removable storage 518. Computer system 500 may be representative of a laptop, desktop, server, workstation, terminal, personal digital assistant (PDA) or any other type of computer system.

Processor subsystem 504 is representative of any of various types of processors such as an x86 processor, a PowerPC processor or a SPARC processor. In some embodiments, processor subsystem 504 includes one or more individual processor units, which may be found within a single physical computer system or distributed across multiple computer systems. Similarly, memory subsystem 502 may include any of various types of memory, including DRAM, SRAM, EDO RAM, Rambus RAM, etc. The memory within subsystem 502 may be located within a single physical device or may be distributed across multiple devices (e.g., a storage array).

I/O interface 512 is operational to transfer data between processor subsystem 504 and/or memory subsystem 502 and one or more internal or external components such as hard disk drive 514, network interface 516 and removable storage 518, as desired. For example, I/O interface 512 may embody a PCI bridge operable to transfer data from processor subsystem 504 and/or memory subsystem 502 to one or more PCI devices. I/O interface 512 may additionally or alternatively provide an interface to devices of other types, such as SCSI devices and/or Fibre channel devices.

Hard disk drive 514 may be a non-volatile memory such as a magnetic media. Network interface 516 may be any type of network adapter, such as Ethernet, fiber optic, or coaxial adapters. Removable storage 518 is representative of a disk drive, optical media drive, tape drive, or other type of storage media, as desired.

In addition to the depicted hardware components, computer system 500 may additionally include various software components. For example, FIG. 5 illustrates an operating system 550 stored in memory subsystem 502. Operating system 550 is representative of any of a variety of specific operating systems, such as, for example, Microsoft Windows, Linux, or Sun Solaris. As such, operating system 550 may be operable to provide various services to the end user and provide a software framework operable to support the execution of various programs such as directory service 101 and application program 104. As depicted in one embodiment in FIG. 5, directory service 101 and application program 104 reside on computer system 500 and are executed by operating system 550. It is noted that the depicted software components of FIG. 5 may be paged in and out of memory subsystem 502 in a conventional manner from a storage medium such as hard drive 514.

In various embodiments (not shown in FIG. 5), portions of application program 104 reside on a separate computer system from directory service 101. For example, backup application 110 may be executed as a service on computer system 500, while restore application 130 may be executed on a different computer system that accesses backup medium 122 and metadata file 120.

Figure 6:
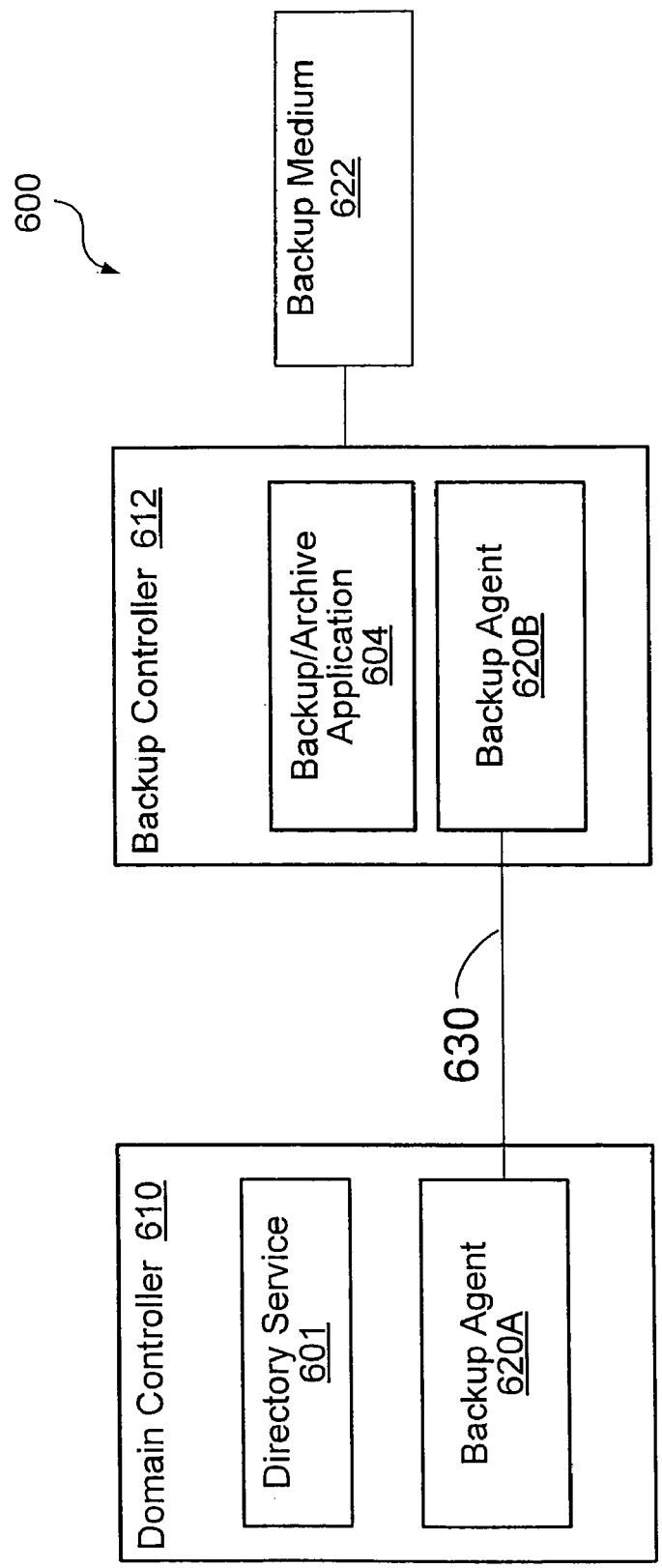
FIG. 6 is a block diagram of one embodiment of a backup system.

Referring to FIG. 6, one embodiment of a system 600 is depicted. It is noted that system 600 may collectively include one or more individual computer systems. Accordingly, a processor subsystem associated with system 600 may include one or more processors. In this embodiment, domain controller 610 is a server computer that is configured to execute a directory service 601 on a network domain. Backup controller 612 is a computer system that is configured to execute an backup/archive application 604 that accesses a backup medium 622. In the embodiment shown, application program 604 operates in conjunction with an additional software component, represented by backup agent 620 (shown in this embodiment as backup agents 620A and 620B), that handles the communication between directory service 601 and application program 604.

In this embodiment, one or more software components (e.g., backup agents 620) are configured to execute on behalf of application program 604 to perform the backup function. (In FIG. 6, these components are shown as 620A and 620B, which may be either identical instances of the same software component, or different components.) Backup agents 620 are configured to access directory service 601 on behalf of application program 604 and return requested information to application program 604. Backup agents 620 may additionally include functionality for encapsulating a network connection to another backup agent or application program. Thus, backup agents 620 may be installed locally or remotely and can be configured to relay information over a network connection. As shown in FIG. 6, a communication link 630 provides bidirectional communication between backup agents 620A and 620B, which are configured to communicate with each other by relaying requests and information. In other embodiments, application program 604 may reside on a single computer system (e.g., domain controller 610 or computer system 500), along with a backup agent (e.g., agent 620).

Note that in some embodiments, a backup application (e.g., 604) and/or associated software components (e.g., 620) may reside on the same computer system with the directory service/database (e.g., domain controller 610).

It is noted that in some embodiments, domain controller 610 may be owned and operated by a different entity than backup controller 612. In various embodiments, backup medium 122 (or access thereto) may be provided by a still different entity. In various embodiments, systems 500, 600 are domain controllers and are configured to execute a directory service for a network domain that includes a plurality of client computers. The client computers (not shown in FIG. 5 or 6) may be configured to centrally access the directory service executing on systems 500, 600.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer system, comprising:
a processor subsystem; and
a memory subsystem storing program instructions executable by the processor subsystem to:
copy a plurality of data objects from a database of a directory service to a backup medium; and
for at least a first of said plurality of copied data objects:
query the database to determine a first private object identifier (POI) associated with the first data object, wherein the first POI is providable via a first interface of the directory service as part of a request to perform a granular restoration of the first data object, wherein the directory service is configured to authenticate the request based at least in part on the request including the first POI, and wherein the directory service is configured to refuse to authenticate the request based on the request not including the first POI; and
store the first POI as metadata associated with the first data object, wherein the first POI is stored as metadata in a location other than the database of the directory service;
wherein the computer system is not configured to generate the first POI from the copy of the first data object stored on the backup medium.

2. The computer system of claim 1, wherein said directory service uses a lightweight directory access protocol (LDAP).

3. The computer system of claim 1, wherein said database is an object database, and wherein without the first POI, the computer system is configured to restore the first data object via the first interface only by performing a monolithic restoration of the plurality of data objects.

4. The computer system of claim 1, wherein said database is a relational database, and wherein without the first POI, the computer system is configured to restore the first data object via the first interface only by performing a monolithic restoration of the plurality of data objects.

5. The computer system of claim 1, wherein said backup medium includes a second database, wherein the second database stores said plurality of copied data objects.

6. The computer system of claim 1, wherein the first POI includes an encrypted version of an object identifier that uniquely identifies the first data object.

7. The computer system of claim 1, wherein generation of the first POI uses a proprietary protocol associated with the directory service.

8. The computer system of claim 1, wherein the metadata is stored in a metadata file, and wherein the metadata file includes an index value and an associated POI for each of one or more of the plurality of copied data objects.

9. The computer system of claim 8, wherein the metadata file is stored on the backup medium.

10. The computer system of claim 1, wherein said program instructions are further executable by the processor subsystem to:
initiate a granular restoration of said first data object to the directory service;
receive said first data object from said backup medium;
receive previously stored metadata associated with said first data object, wherein said metadata includes said first POI; and
use said first POI and said received first data object to granularly restore said first data object via said first interface of said directory service.

11. The computer system of claim 10, wherein at least a portion of said POI is encrypted.

12. The computer system of claim 11, wherein said first interface is a cached API, and wherein said first POI is required to access the directory service via said first interface.

13. The computer system of claim 10, wherein said computer system is configured to perform said backup via a second interface to said directory service.

14. The computer system of claim 13, wherein said first and second interfaces of said directory service are different interfaces using different authentication protocols.

15. A computer system, comprising:
a processor subsystem; and
a memory subsystem storing program instructions executable by the processor subsystem to:
initiate a request to perform a granular restoration of a first data object from a backup medium to a database of a directory service;
receive said first data object from said backup medium;
receive, from a location external to said database, a first private object identifier associated with said first data object, wherein said computer system is not configured to generate said first object identifier from a copy of the first data object stored on said backup medium; and
use said received first data object and said received first private object identifier to access said database via a first interface of the directory service to restore said first data object, wherein accessing said database to restore said first data object is performed according to an authentication protocol that includes providing a request including said first private object identifier, wherein the directory service is configured to authenticate the request based at least in part on the request including the first private object identifier, and wherein the directory service is configured to refuse to authenticate the request based on the request not including said first private object identifier.

16. The computer system of claim 15, wherein generation of said first private object identifier uses a proprietary protocol associated with the directory service, and wherein at least a portion of said first object identifier is encrypted.

17. The computer system of claim 15, wherein said directory service is accessible using a lightweight directory access protocol (LDAP).

18. A computer-readable memory medium including program instructions executable by a computer system to:

copy a plurality of data objects from a database of a directory service to a backup medium; and for at least a first of said plurality of copied data objects, query the database to determine a first private object identifier (POI) associated with the first data object, wherein the first POI is providable via a first interface of the directory service as part of a request to perform a granular restoration of the first data object, wherein the directory service is configured to authenticate the request based at least in part on the request including the first POI, and wherein the directory service is configured to refuse to authenticate the request based on the request not including the first POI; and store the first POI as metadata associated with the first data object, wherein the first POI is stored as metadata in a location other than the database of the directory service;

wherein the computer system is not configured to generate the first POI from the copy of the first data object stored on the backup medium.

19. The computer-readable memory medium of claim 18, wherein the directory service uses an LDAP protocol, and wherein the first interface of the directory service is accessible via a cached API.

20. The computer-readable memory medium of claim 18, wherein said program instructions are further executable by the computer system to:

initiate a granular restoration of said first data object from said backup medium to the database;

receive said first data object from said backup medium;

receive previously stored metadata associated with said first data object, wherein said metadata includes said first POI; and use said first POI and said received first data object to granularly restore said first data object via said first interface of said directory service.

21. A computer-readable memory medium including program instructions executable by a computer system to:

initiate a request to perform a granular restoration of a first data object from a backup medium to a database, wherein said database is of a directory service;

receive said first data object from said backup medium;

receive, from a location external to said database, a private object identifier associated with said first data object, wherein said computer system is not configured to generate said private object identifier from a copy of the first data object stored on said first data object stored on said backup medium; and use said received first data object and said received object identifier to access said database via a first interface of the directory service to restore said first data object, wherein accessing said database to restore said first data object is performed according to an authentication protocol that includes providing said private object identifier, wherein the directory service is configured to authenticate the request based at least in part on the request including the private object identifier, and wherein the directory service is configured to refuse to authenticate the request based on the request not including said private object identifier.

* * * * *